United States Patent
Buehrlen

(10) Patent No.: US 6,776,521 B2
(45) Date of Patent: Aug. 17, 2004

(54) DATA CARRIER HAVING INDICATION MEANS FOR INDICATING A CHANGE OF A PARAMETER INFLUENCING THE DATA CARRIER

(75) Inventor: Martin Buehrlen, Grosssteinbach (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/262,706

(22) Filed: Oct. 2, 2002

(65) Prior Publication Data

US 2003/0067959 A1 Apr. 10, 2003

(30) Foreign Application Priority Data

Oct. 4, 2001 (EP) .............................. 01890286

(51) Int. Cl.$^7$ .......................... G01K 3/04; G01K 11/00
(52) U.S. Cl. ........................ 374/106; 374/102; 374/4; 374/57
(58) Field of Search ............................ 374/4, 45, 57, 374/100–102, 104, 106, 109, 160, 161, 159, 133

(56) References Cited

U.S. PATENT DOCUMENTS

| 804,275 | A | * | 2/1905 | Kang et al. .................. 374/162 |
| 4,664,056 | A | * | 5/1987 | Jehanno ....................... 116/217 |
| 5,313,848 | A | * | 5/1994 | Santin et al. .............. 73/866.2 |
| 5,673,028 | A | * | 9/1997 | Levy .......................... 324/556 |
| 5,712,609 | A | | 1/1998 | Mehregany et al. .......... 337/70 |
| 6,320,512 | B1 | * | 11/2001 | Nicholson et al. .......... 340/588 |
| 6,480,091 | B1 | * | 11/2002 | Scott et al. ................. 337/332 |
| 6,488,405 | B1 | * | 12/2002 | Eppes et al. ................... 374/5 |

FOREIGN PATENT DOCUMENTS

| WO | WO 9953279 | 10/1999 | ............ G01K/7/01 |

* cited by examiner

Primary Examiner—Gail Verbitsky
(74) Attorney, Agent, or Firm—Kevin Simons

(57) ABSTRACT

In a data carrier (1) having an electrical circuit (2), indication means (3) are implemented by means of the electrical circuit (2), which means are arranged so as to determine the occurrence of a change in a parameter influencing the data carrier (1) in relation to at least one threshold value, the at least one threshold value dividing a first parameter range from a second parameter range, and which means are arranged so as to give a permanent indication of the change during the time following the first occurrence of said change.

12 Claims, 2 Drawing Sheets

Figure 1:
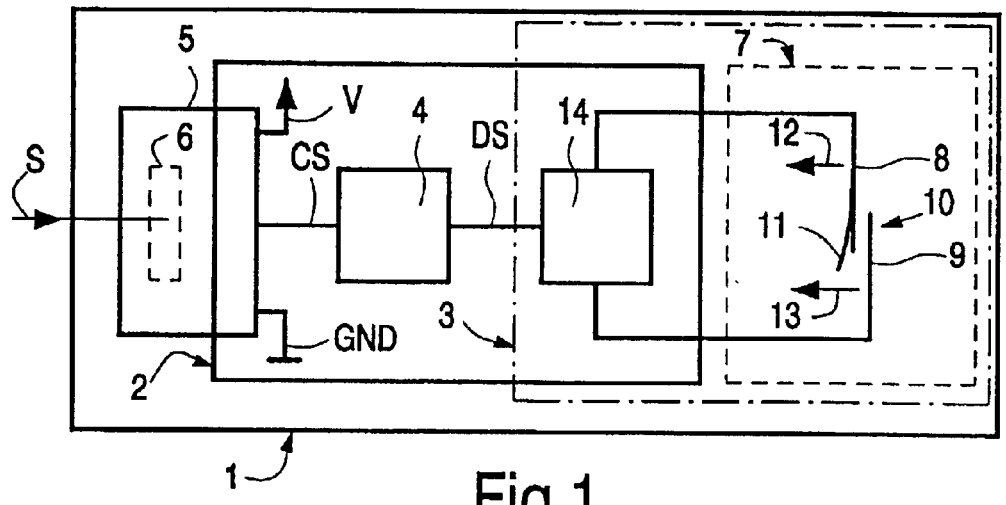

DATA CARRIER HAVING INDICATION MEANS FOR INDICATING A CHANGE OF A PARAMETER INFLUENCING THE DATA CARRIER

The invention relates to a data carrier having an electrical circuit with the help of which indication means are implemented that are arranged to indicate a change of a parameter influencing the data carrier in relation to a threshold value of the parameter, which threshold value divides a first parameter range from a second parameter range.

The invention further relates to a circuit for a data carrier with the help of which indication means are implemented that are arranged to indicate a change of a parameter influencing the data carrier in relation to a threshold value of the parameter, which threshold value divides a first parameter range from a second parameter range.

The invention further relates to a method of determination for determining the occurrence of a change of a parameter influencing a data carrier, the occurrence of the change of the parameter being determined in relation to a threshold value of the parameter, which threshold value divides a first parameter range from a second parameter range.

A data carrier of the kind defined in the first paragraph, a circuit of the kind defined in the second paragraph, and a method of determination of the kind defined in the third paragraph are known from patent WO 99/53279.

The known data carrier is in the form of a passive data carrier, is suitable for detecting a change in the ambient temperature of the data carrier in relation to a temperature threshold, is intended for use in a vehicle tire, and has indication means that are implemented in the form of a mechanical maximum temperature measuring switch that forms a sensing means for sensing the ambient temperature. In essence, the maximum temperature measuring switch comprises two bars that slightly overlap one another in an overlapping region and that do not touch one another at a starting temperature. Each of the bars has a laminated structure comprising a layer of metal and a plurality of mutually differing layers of silicon. The laminated structure causes the two bars to bend in the same direction by virtue of the bimetallic effect if there is a change in temperature, with the first bar—due to the fact that it is differently sized from the second bar—undergoing less bending than the second bar. Hence, beginning from the starting temperature, the second bar bends relative to the first bar when there is a rise in temperature until it touches the first bar on one side of the latter. As the temperature continues to rise up to the threshold temperature value, the two bars slide against one another in the overlapping region. When the threshold temperature value is exceeded, the two bars lose physical contact with one another and—due to the removal of the force exerted on the first bar by the second bar—the first bar springs back substantially to its starting position. In this state the two bars differ appreciably from one another in the bending they show and, similarly to the situation that exists at the starting temperature, are not in physical contact with one another. Only if the ambient temperature falls back to the starting temperature is the bending of the second bar reduced sufficiently for it eventually to touch the first bar at a point of contact. In this situation, the maximum temperature measuring switch forms an electrically conductive, closed contact, which closed contact can be detected by means of an electrical circuit belonging to the data carrier. Hence it is only at this starting temperature that the maximum temperature measuring switch is controlled to its active state and is thus suitable for determining the fact that there has, at least once in the past, been a change in the ambient temperature of the data carrier in relation to the temperature threshold. This characteristic of the maximum temperature measuring switch is not critical especially if, following a temperature change of this kind occurring for the first time, the starting temperature obtains again at the time when the temperature change is determined to have occurred by means of a communication station provided and arranged to cooperate with the known data carrier.

In connection with a bimetallic sensor of the kind described above, reference may be made, for example, to U.S. Pat. No. 5,712,609. Reference should be made in this connection to FIGS. 1A to 1D, 2A to 2D, and 3 and the related passages in the description. This reference to the patent in question is deemed to incorporate the disclosure thereof in the present document by reference.

There is a problem with the known data carrier in that, if the ambient temperature is higher than the threshold temperature value and the passive data carrier is fed with power at this time, it cannot be clearly determined with the maximum temperature measuring switch—due to the fact that this can only be done intermittently as a function of ambient temperature—whether there was a temperature change of this kind in the past, given that the two bars are not in contact with one another when the starting temperature exists, both before any such temperature change occurred for the first time and after a temperature change of this kind. This fact may well not be critical where the application is to a vehicle tire, because a vehicle tire is virtually always able to cool down to its starting temperature after a run during which a temperature change of this kind may possibly have occurred. In other cases however, the fact described above may have disadvantageous consequences.

It is an object of the invention to overcome the problems outlined above in a data carrier of the kind defined in the first paragraph above and in a circuit of the kind defined in the second paragraph above and in a method of determination of the kind defined the third paragraph above, and to provide an improved data carrier and an improved circuit and an improved method of determination.

To achieve the object detailed above, in accordance with the invention, provision is made, in a data carrier of the kind defined in the first paragraph above, provision is made for the indication means to be arranged so as to give a permanent indication of the change of the parameter during the time following the occurrence of the change for the first time.

To achieve the object detailed above, in accordance with the invention, provision is made, in a circuit of the kind defined in the second paragraph above for the indication means to be arranged so as to give a permanent indication of the change of the parameter during the time following the occurrence of the change for the first time.

To achieve the object detailed above, in accordance with the invention, provision is made in a method of determination of the kind defined in the third paragraph above for the determination of the occurrence of the change of the parameter to be permanent during the time following the occurrence of the change for the first time.

The provisions according to the invention provide the advantage that, regardless of a parameter that exists momentarily and influences the data carrier, a permanent indication of high reliability can be obtained of a change of the parameter that has already occurred earlier, and as a result the occurrence of this change can be determined. This is of advantage principally if the parameter is formed by the ambient temperature and if the data carrier is used with a deep-frozen foodstuff to determine that there has been, in the past, an unwanted break in the deep-freezing. In connection with the determination of a break in the effect of deep-freezing on a foodstuff, or in other words when determining the occurrence of a change in temperature in relation to a defrosting point of the foodstuff that forms a threshold temperature value, it is possible to avoid deleterious effects on the health of human beings by means of the provisions according to the invention, because people can be prevented from eating a foodstuff of this kind that may possibly have already been defrosted once in the past and have then been deep-frozen again.

In a solution according to the invention, it has also proved advantageous if the sensing means are arranged to remain in the changed detecting state, irrespective of the ambient temperature, during the time following the occurrence of the change of the parameter for the first time. This gives the advantage that, with mechanical sensor means arranged to sense ambient temperature, such as, for example, by means of a sensor that employs the bimetallic effect and is arranged to implement the provisions according to the invention, it is possible to obtain a permanent indication of a change in temperature during the time following the occurrence of the change in temperature for the first time.

In a solution according to the invention, it has also proved advantageous if at least one conductor region is provided to determine the occurrence of the change of the parameter and if at least one storage means is provided that is arranged to store a medium suitable for influencing an impedance, which medium can be dispensed from the storage means towards at least one conductor region, and if recognition means are provided for recognizing a state of the impedance that exists in the at least one conductor region and that depends on the presence or absence of said medium. This gives the advantage that the permanent indication of the change of a parameter can be obtained on the basis of physics-related or chemical properties of the medium virtually irrespective of mechanical influencing factors. Also, a solution of this kind can be manufactured in a structurally simple manner.

In a solution according to the invention, it has also proved advantageous if feed means are provided for feeding the medium to the at least one conductor region. This gives the advantage of providing an assurance that the medium, which may, for example, be in the liquid state, will be fed as accurately as possible to the at least one conductor region.

In a solution according to the invention, it has also proved advantageous if activation means are provided that are arranged to activate the feed of the medium to the at least one conductor region. This gives the advantage that the activation of the feed of the medium to the at least one conductor region can be carried out after the manufacture of a data carrier on the premises of a data carrier manufacturer or on the premises of a user of the data carrier. It may be mentioned in this connection that the activation means may be formed, for example, by the application of a pressure to the data carrier to activate the feed of the medium, such as happens, for example, when the data carrier is applied to a product by pressure. This gives the advantage that, as a consequence of the application, it can be clearly determined at a time following the application that there was, at the time of application, a minimum pressure that is required for the safe and reliable application of the data carrier to the product. What has proved particularly advantageous, however, is for the activation means to be arranged to automatically activate the feed of the medium, which is in its frozen, i.e. solid, state, as a result of a change in the ambient temperature of the data carrier in relation to a freezing point of the medium such as occurs, for example, when a foodstuff to which the data carrier is applied is cryogenically frozen, which means that after the medium has changed from its solid to its liquid state there are no problems in feeding it from the storage means to the at least one conductor region.

In a solution according to the invention, the at least one conductor region may be arranged inside the data carrier adjacent the electrical circuit. It may be mentioned in this connection that the at least one conductor region may, for example, be arranged on a supporting foil carrying the data carrier, on which foil a communications coil intended for communications and the electrical circuit connected to the communications coil are arranged in a known fashion in the case of an active or a passive data carrier. In such a case the at least one conductor region is connected to the electrical circuit by connecting means. It has proved particularly advantageous, however, for the at least one conductor region to be a part of the electrical circuit. This gives the advantage that no additional stages of production are required to provide the at least one conductor region when manufacturing the data carrier, and that the at least one conductor region is in a clearly defined location relative to the electrical circuit. Another advantage is that, in a process for manufacturing the electrical circuit, the manufacture of the at least one conductor region can be carried out as part of the process, thus affording a considerable saving in costs when manufacturing the electrical circuit and hence also the data carrier. It may also be mentioned in connection with the at least one conductor region that the at least one conductor region may be covered with a layer for passivating the electrical circuit, thus reliably preventing any possible oxidation of the at least one conductor region subsequent to the manufacture of the electrical circuit. What has proved particularly advantageous, however, when using inert materials for the at least one conductor region is for the at least one conductor region to be formed as part of the electrical circuit free of the passivating layer. A gold coating of the at least one conductor region may, for example, be mentioned in this connection. This gives the advantage that a change in resistance can be recognized between, for example, two conductor regions for the purpose of an uninterrupted determination of the occurrence of the change of the parameter for the first time, which recognition may most easily be carried out electrically.

In a solution according to the invention, the storage means may be in sponge form, in which case an outer side of a means of this kind in sponge form must have closed pores to prevent any unwanted and uncontrolled emergence of the medium from the storage means in sponge form. The provision of storage means in sponge form gives the advantage that they can be brought virtually directly into contact with the at least one conductor region without the need to call on additional means. Another advantage is that storage means of this kind may be given an initial shape, which has proved particularly advantageous when assembling the data carrier. It has, however, proved particularly advantageous for the storage means to be given the shape of a bladder. This provides the advantage that the storage means can be manufactured as inexpensively as possible. It also gives the advantage that the shape of the storage means can be distorted virtually without any mechanical resistance being encountered. This gives the further advantage that a storage means of this kind in bladder form can be incorporated in the data carrier with relatively few problems when the data carrier is being manufactured. It this connection it has also been found particularly advantageous for the storage means in bladder form to be produced from an elastic material that exerts an initial pressure on the medium stored either as a result of the storage means being filled with the medium or as a result of the storage means being fitted into the data carrier. This gives the advantage that, as a function of orientation and position, it encourages a desired emergence of the medium from the at least one storage means in the direction of the at least one conductor region.

In a solution according to the invention, the feed means may be in sponge, or non-woven, or tube, or hose form. What has proved particularly advantageous, however, is for the feed means to be in capillary form. This gives the advantage of ensuring that the medium is fed to the at least one conductor region reliably and virtually irrespective of the orientation or position of the data carrier by making use of the physical principle of capillary attraction.

In a solution according to the invention, the recognition means may be arranged so as to recognize inductively a state of the impedance that is present in the at least one conductor region and that depends on the presence or absence of the medium. It may be mentioned in connection with the recognition means arranged for inductive recognition that they may be arranged so as to recognize an inductance of a coil or a quality (Q factor) of the coil, which coil may be implemented by means of the single conductor region. In a solution according to the invention, the recognition means may be arranged for the capacitive recognition of a state of the impedance that is present in the at least one conductor region and that depends on the presence or absence of the medium. It may be mentioned in this connection that the recognition means arranged for capacitive recognition may, for example, be constructed as a non-stable multivibrator in which the frequency of a recognition signal can be changed as a function of the presence or absence of the medium, for example, between two conductor regions. What has provided particularly advantageous, however, is for the recognition means to be formed by a comparator stage. This gives the advantage that where there are at least two conductor regions free of the layer for passivating the electrical circuit, the recognition of a level of resistance between the two conductor regions can be carried out in a manner that is as simple as possible to implement electronically.

In a solution according to the invention, the medium may be prepared in the form of alcohol diluted with water. What has proved particularly advantageous, however, is for the medium to be produced in the form of an aqueous salt solution. This gives the advantage that a salt solution of this kind has particularly good electrical conductivity, which has proved particularly advantageous in connection with recognition means arranged to recognize a resistance between, for example, two conductor regions, which regions may, for example, be coated with platinum to prevent oxidation. It may also be mentioned here that the electrical conductivity may be advantageously acted on by, for example, adding metallic components such as powdered metal or metal ions, for example, or graphite. It may further be mentioned that the medium provided may be a so-called two-component liquid in which the two components are separate from one another in their solid state but which, after the two components have melted and mixed together, will no longer freeze. This gives the advantage that, when the medium is present between the conductor regions, an impedance that is not dependent on the ambient temperature can be recognized between the two conductor regions by the recognition means. It may also be mentioned it connection with the two-component liquid that the at least one storage means may advantageously be arranged to store the two components of the liquid separately. It may further be mentioned that the medium may alternatively be formed by organic liquids or jelly-like substances or gaseous substances or powder-like substances, in which cases an absence or presence of the given medium must be recognizable at the at least one conductor region on the basic of the physics-related or chemical properties of the media. It may further be mentioned that use may also be made as a medium of solidified liquids that can be fed to the at least one conductor region in their liquid state as a result of a change in temperature.

These and other aspects of the invention are apparent from and will be elucidated with reference to two embodiments which are shown in the drawings but to which the invention is not limited.

FIG. 1 diagrammatically shows a data carrier in accordance with a first embodiment of the invention, comprising a temperature sensor, in the form of a block circuit diagram.

Figure 2:
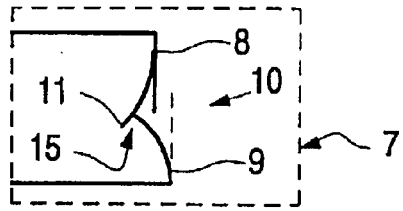

FIG. 2 diagrammatically shows the temperature sensor of the data carrier shown in FIG. 1 subsequent to the occurrence of a change of the ambient temperature of the data carrier from a first temperature range to a second temperature range.

Figure 3:
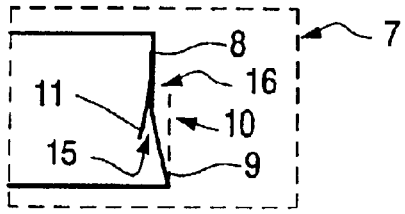

FIG. 3 shows, in a similar way to FIG. 2, the temperature sensor of the data carrier shown in FIG. 1, but subsequent to a change in temperature from the second temperature range to the first temperature range.

Figure 4:
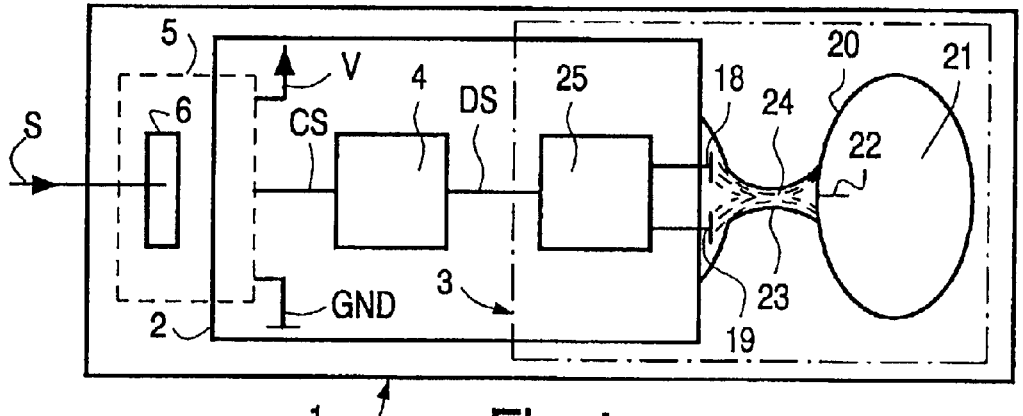

FIG. 4 diagrammatically shows a data carrier in accordance with a second embodiment of the invention in the form of a block circuit diagram.

Figure 5:
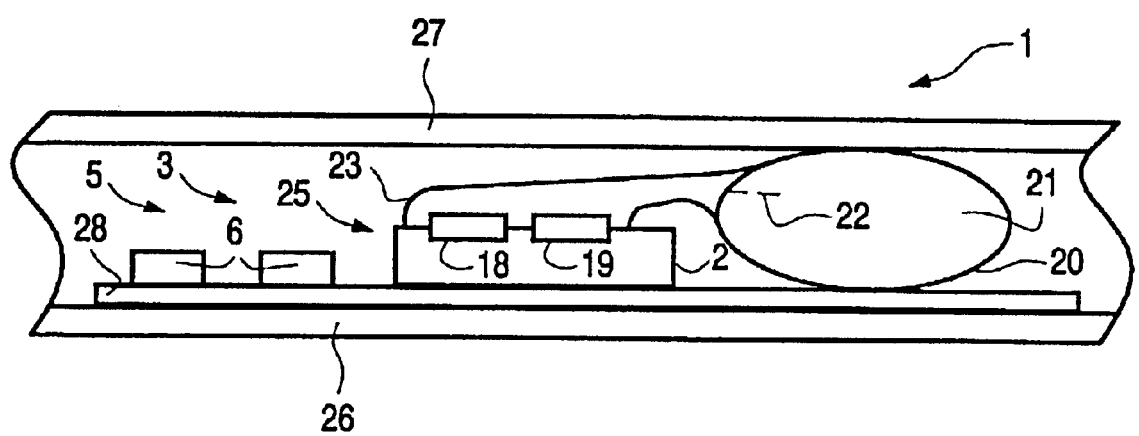

FIG. 5 is a diagrammatic cross-sectional view of part of the data carrier shown in FIG. 4.

Shown in FIG. 1 is a passive data carrier 1 arranged for contactless communication and having an electrical circuit 2 that is used to implement indication means 3 arranged to indicate a change of an ambient parameter of the data carrier 1 in relation to a threshold value of the ambient parameter, said at least one threshold value dividing a first ambient parameter range from a second ambient parameter range.

In the present case, the data carrier 1 is provided inside a vehicle tire, in which case the ambient temperature forms the ambient parameter and a threshold value for temperature forms the threshold value of the ambient parameter, which means that the indication means are arranged to indicate a change of the ambient temperature in relation to the threshold temperature value. The data carrier 1 is used in the vehicle tire to detect any overrun of a maximum temperature value of 120° C. Hence the maximum temperature value of 120° C. forms the threshold temperature value. A first temperature range that forms the first ambient parameter range thus comprises temperature values that are lower than the threshold temperature value and a second temperature range that forms the second ambient parameter range thus comprises temperature values that are higher than the threshold temperature value. In accordance with the invention, the indication means 3 are arranged to give a permanent indication of the change in temperature during the time following the first occurrence of the change in temperature in relation to the threshold temperature value, the indication means 3 being arranged to generate and emit—provided a supply voltage V is present for the electrical circuit 2 in the present case—an indication signal DS uninterruptedly and irrespective of temperature during the time following the change in temperature occurring for the first time, which indication signal DS conveys the information that the change in temperature in question has occurred at least once in the past.

The data carrier also has signal processing means 4 that are arranged to receive the indication signal DS and to generate and emit a communication signal CS representing the indication signal DS. The signal processing means are implemented by means of a microprocessor. It may also be mentioned that the signal processing means 4 may alternatively take the form of a hard-wired circuit. The data carrier 1 also has communication means 5 that are arranged for contactless transmission of the communication signal CS under standard ISO 15693. It may be mentioned in this connection that the data carrier 1 may be arranged both for communication over short distances (up to approx. 1.5 m), as in the present case, and for communication over long distances (up to approx. 3 m). Communication means 5 are further arranged to produce inductive coupling with a communication device (not shown in FIG. 1), said communication device emitting a high-frequency carrier signal S. The communication means 5 for this purpose have a coil configuration 6. When there is inductive coupling between the coil configuration 6 of the data carrier 1 and a coil configuration in the communication device, the communication means 5 are further arranged to generate a supply voltage V for the electrical circuit 2 relative to a reference potential GND. The communication means 5 are further arranged, when the inductive coupling is present, to load-modulate the high-frequency carrier signal S as a function of the communication signal CS transmitted by the signal processing means 4 to the communication means 5, by which means it is possible for the information that a change in temperature in relation to the threshold temperature value has occurred for the first time in the past to be transmitted from the data carrier 1 to the communication station. It may be mentioned that the communication means 5 may alternatively be arranged to receive an interrogation signal and that the signal processing means may be arranged to generate the communication signal CS and transmit it to communication means 5 in response to the interrogation signal.

To implement the indication means 3, the data carrier 1 advantageously has sensing means 7 which are arranged so as to sense the ambient temperature, said sensing means 7 having at least two temperature-dependent sensing states and being arranged to change their sensing state when there is a change of ambient temperature from the first temperature range to the second temperature range. In accordance with the invention, the sensing means 7 are arranged to remain in the changed sensing state, irrespective of temperature, during the time following the occurrence of the change in temperature for the first time. The sensing means are implemented with the help of a mechanical temperature sensor in the present case whose operation is based on the bimetallic effect.

The temperature sensor has a first bar 8 and a second bar 9. In a starting state, that is to say at a starting temperature of approx. 25° C., the second bar 9 overlaps the first bar 8 in an overlapping region 10, in which case the first bar 8 and the second bar 9 do not touch one another. The sensing means 7 also have a strip 11 for permanent contact that has an electrically conductive connection to the first bar 8 and that, in relation to the second bar 9 when the latter is in its starting state—or in other words before the change in temperature in relation to the threshold temperature value occurs for the first time—is situated on the side of the first bar 8 remote from the second bar 9. The strip 11 for permanent contact is arranged to put the first bar 8 into permanent, i.e. uninterrupted and non-temperature-dependent, contact with the second bar 9 after the change in temperature in relation to the threshold temperature value has occurred for the first time.

The two bar 8 and 9 are so dimensioned and arranged that, if there is a rise in temperature in the direction of the threshold temperature value, the bending that the two bars undergo differs between them—due to the bimetallic effect and the fact that they are of different sizes—with the first bar 8 undergoing less bending than the second bar 9. If there is a rise in temperature, the first bar 8 bends in the direction of a first arrow 12 and the second bar 9 bends in the direction of a second arrow 13. The relative lengths of the arrows 12 and 13 shown in FIG. 1 is a symbolic indication of the difference in bending that the two bars 8 and 9 undergo.

For as long as the sensor forming the sensing means 7 is exposed to an ambient temperature whose value is less than the threshold temperature value, the sensing means 7 are in a first sensing state, in which first sensing state the two bars 8 and 9 form an open electrical contact even if they touch one another in the overlapping area 10 as a result of a rise in temperature. When the change in temperature from the first temperature range to the second temperature range occurs for the first time, i.e. when the threshold temperature value is reached for the first time, the bending to which the two bars 8 and 9 are subject is one where they lose contact with one another. Owing to its dimensions, the first bar 8 then moves virtually fully back to its starting position, while the second bar, owing to the removal of the restraining force exerted by the first bar 8, bends to a greater degree. It may be mentioned that the first bar 8 may still show some residual bending. The situation in question is shown in FIG. 2. After the change in temperature in relation to the threshold temperature value has occurred for the first time, the second bar 9, which has bent past the first bar 8, touches the strip 11 for permanent contact at a first point of contact 15, the first point of contact 15 shifting along the strip 11 for permanent contact if there is a change in temperature, in line with the bending of the two bars 8 and 9 at the time. The first point of contact 15 between the strip 11 for permanent contact and the second bar 9 forms a closed electrical contact, as a result of which a second sensing state of the sensing means 7 is produced. Owing to the permanent and above all non-temperature-dependent contact between the second bar 9 and the strip 11 for permanent contact, the sensing means 7 are thus arranged to remain in the changed sensing state, i.e. in the second sensing state, irrespective of temperature, during the time following the first occurrence of the change in temperature.

Even if the value of the ambient temperature drops to the starting temperature, the strip 11 for permanent contact and the second bar 9 will remain in permanent contact with one another, while the second bar 9 and the first bar 8 will be in contact with one another at a second point of contact 16 shown in FIG. 3. It may be mentioned that the second point of contact 16 may also form a closed, additional electrical contact.

The data carrier 1 also has detection means 14 which are in electrically conductive contact with the sensing means 7, i.e. with both the first bar 8 and the second bar 9, and which are further arranged for detecting whether the sensing means 7 are in their first or their second sensing state, i.e. for detecting whether there is a closed or an open electrical contact between the two bars 8 and 9. The detection means 14 form part of the electrical circuit 2 and of the indication means 2. The detection means 14 are arranged to generate and emit the indication signal DS when the second sensing state is detected. In the present case the detection means 14 are implemented in the form of a transistor circuit (not shown in FIG. 1), the sensing means 7 being connected by the first bar 9 to the reference potential GND and by the second bar 9 to the base of a transistor in the transistor circuit, which means that if there is a change in the sensing state there will also be change in an output signal from the transistor circuit, which output signal from the transistor circuit forms the indication signal DS.

The operation of the data carrier 1 will now be explained with reference to a practical example of the data carrier shown in FIG. 1, wherein the method of determination according to the invention is performed to determine the occurrence of a change of the ambient parameter of the data carrier 1, i.e. in the present case, to determine the occurrence of the change of the ambient temperature of data carrier 1 that forms the ambient parameter, wherein the method of determination performed by the data carrier 1 comprises the following steps: detecting the occurrence of the change in temperature of the data carrier 1 in relation to at least one threshold temperature value, the at least one threshold temperature value dividing a first temperature range from a second temperature range, and permanent and uninterrupted indication of the occurrence of the change in temperature during the time following the first occurrence of the change in temperature.

It is assumed in this embodiment that the passive data carrier 1 is housed inside a vehicle tire to be tested and that parts of the communication device for receiving the communication signal CS that is to be communicated by means of load-modulation are provided outside the tire in the region of the bodywork of the vehicle. Hence the data carrier 1 is moved past the parts of the communication device exactly once during each revolution of the vehicle tire and during this it passes through a region in which the high-frequency signal S is present each time. With the help of the high-frequency signal S, the communication means 9 generate the supply voltage for the electrical circuit 2 relative to the reference potential GND. During an interval when the supply voltage V is present, one of the two temperature-dependent sensing states of sensing means 7 will be detected by the detection means 14.

It is assumed in the present case that after a warm-up phase for the vehicle tire 1, the value of the ambient temperature of the data carrier 1 is 60° C. It is also assumed that, due to the dimensions of the two bars 8 and 9, the first bar 8 and the second bar 9 are in contact with one another in the overlapping region 10 and that the detection means 14 therefore detect an open electrical contact.

To continue the sequence, it is assumed that phases in which the vehicle is braked or accelerated hard cause the ambient temperature of the data carrier 1 inside the vehicle tire to rise to a value of 130° C. and that the first bar 8 therefore loses contact with the second bar 9 at the threshold temperature value of 120° C., which means that from then on the second bar 9 will be permanently in contact with the strip 11 for permanent contact, as shown in FIG. 2 and FIG. 3. Hence, during the time following the first occurrence of the change in temperature, the detection means 14 detect the second sensing state of the sensing means 7 at each revolution of the tire and do so uninterruptedly and above all irrespective of temperature. As a result of the second sensing state being detected, the indication means 3 transmit the indication signal DS to the signal processing means 4, where the communication signal CS representing the first occurrence of the change in temperature is generated and transmitted to the communication means 5 and is communicated to the communication device by the communication means 5. It may be mentioned that the communication signal CS communicated may be used in the communication device to generate a warning signal.

In the present case, the crucial advantage is obtained that even subsequently to the occurrence of the first change in temperature in relation to the threshold temperature value, and even if there are extreme fluctuations in temperature, the fact of this change in temperature having occurred for the first time can be reliably and reproducibly indicated by the indication means 3. The indication is performed electrically or electronically in this case through the indication signal DS.

It may be mentioned that the data carrier 1, that has sensing means 7 arranged to remain in the second sensing state irrespective of temperature, may preferably be used in disposable products, such as in a Formula 1 tire, for example. It may also be mentioned that the sensing means 7 may be arranged for deliberate resetting to their starting state, i.e. to the first sensing state, thus enabling the data carrier 1 to be used also for repeatedly determining, in a planned manner that the change in temperature in relation to the threshold temperature value has taken place for the first time in running or testing cycles that can be individually distinguished.

In the data carrier 1 shown in FIG. 4, the indication means 3 have two conductor regions, namely a first conductor region 18 and a second conductor region 19, which two conductor regions 18, 19 form part of the electrical circuit 2. In the present case the two conductor regions 18, 19 are positioned so as to be free of a passivating layer enclosing the electrical circuit 2 and are coated with gold.

The data carrier 1 also has a single storage means 20 that is provided to store a medium 21 that, in the present case, can have its aggregation state changed as a function of the ambient temperature and that is capable of wetting, capable of flowing, and electrically conductive, the storage means 20 being arranged to dispense the medium 12 as a function of the ambient temperature. The storage means 20 is bladder-like in shape and is made from an elastic material, thus allowing an initial pressure to be exerted on the medium 21 stored in the storage means 20 by means of the elasticity of the material. It has been found to be particularly advantageous if the medium 21 is an aqueous salt solution, firstly because in an aqueous salt solution of this kind the freezing point or melting point can be defined without any difficulty over wide temperature ranges via the concentration of salt in the salt solution, and also because the salt solution has in both its solid and its liquid state an electrical conductivity that is advantageous in the present case, while the medium 21 as such can be produced at very low cost.

The data carrier 1 also has activating means 22 that in the present case are implemented in the form of an intended rupture point in the storage means 20. The intended rupture point is dimensioned such that freezing of medium 21 causes a change in the volume of the medium 21, and this produces a split or crack in the envelope of the storage means 20, which split, when the medium 21 melts, allows the medium 21 in its liquid state to exit through the split. The activating means 22 are thus arranged to activate a feed of the medium 21, when in its liquid state, to the two conductor regions 18, 19.

The data carrier 1 also has feed means 23 that are intended to feed the medium 21, when in its liquid state, to the two conductor regions 18, 19. The feed means 23 are essentially tubular in shape and their first end covers over the two conductor regions 18, 19. It may be mentioned in this connection that it is advantageous but not essential for the two conductor regions 18, 19 to be covered over. The second end of the feed means 23 covers over the desired break point in the storage means 20. Inside them, the feed means also have capillaries 24 that promote the feed to the two conductor regions 18, 19 of the medium 21 that has issued from the storage means 20 through the split. Hence the feed means 23 are in capillary form.

The data carrier 1 also has recognition means 25 that are intended to recognize a state of the impedance that exists between the two conductor regions 18, 19 and that depends on the presence or absence of the medium. In the present case the recognition means 25 are arranged to recognize a change in the value of the resistance that exists between the two conductor regions 18, 19 and that depends on the presence or absence of the medium 21. It has been found to be particularly advantageous in this connection if the recognition means 25 are formed with the help of a comparator stage (not shown in FIG. 4) because this comparator stage can compare, in the easiest possible way, a drop in reference voltage across a reference resistor (not shown in FIG. 4) with a drop in voltage that occurs between the first conductor region 18 and the second conductor region 19.

The electrical circuit 2 is in the form of an integrated circuit in the present case and the comparator stage is implemented in the form of an operational amplifier (not shown in FIG. 4).

The operation of the data carrier 1 will now be explained with reference to a practical example of the data carrier shown in FIG. 2, it being assumed in the present case that the data carrier 1 is used for determining the occurrence of an interruption in the deep-frozen state of a foodstuff. What specifically needs to be ascertained in this case is a change in the ambient temperature of the data carrier 1 in relation to a threshold temperature value formed by the defrosting point of a foodstuff. The data carrier 1, which is in the form of a so-called "smart label" in the present case, is for this purpose manufactured by a data carrier manufacturer to the design shown in FIG. 5 and is supplied to a foodstuff producer, on whose premises foodstuffs are deep-frozen for later use by a cryogenic freezing process. The data carrier 1 shown in FIG. 5 has a bottom member 26, also called a substrate, and a cover member 27. The two members 26 and 27, only partly shown in FIG. 4, enclose a space in the data carrier 1 that is closed off from the exterior and in which all the elements of the data carrier 1 are housed. The data carrier 1 has a carrier member 28 that is fixed to the bottom member 26, on which carrier member 28 the electrical circuit 2, the coil configuration 6 and the storage means 20 are arranged.

In the as-supplied state, the data carrier 1 supplied by the data-carrier manufacturer to the foodstuff producer has in its storage means 20 a liquid medium 21, which is a salt solution in the present case, the melting point of the medium being identical to a refrigeration temperature, which refrigeration temperature is the minimum required to prevent any loss in the quality of the foodstuff or any shortening of the time during which it can be kept. From experience, this refrigeration temperature is lower than the defrosting point of the foodstuff. The foodstuff producer fastens the data carrier 1 to the foodstuff to be frozen mechanically, which may be done, for example, by sticking it to a packaging on the foodstuff. In the course of the cryogenic freezing process, the medium 21 changes from the liquid to the solid state and in so doing undergoes an increase in volume, which increase in volume is sufficient to produce an opening in the envelope of the storage means along a desired rupture point that forms the activating means 22. A plurality of deep-frozen foodstuffs of this kind are delivered to retailers following the cryogenic freezing, using trucks designed for deep-frozen foodstuffs, and the retailers store them in deep freeze cabinets from which a customer can personally withdraw the deep-frozen foodstuffs. In the present case the deep freeze cabinets are fitted in their withdrawal area with the communication device that is arranged to communicate with the data carrier 1, i.e. that in the present case is arranged to receive, when necessary, the communication signal CS representing the indication signal DS. The communication device is also arranged to generate a refrigeration interruption alarm if it receives the communication signal CS from a data carrier 1.

In the present case it is further assumed that a loss of refrigerating capacity has occurred on a truck due to a technical fault, which has meant that the minimum refrigeration temperature required has been exceeded for at least some of the foodstuffs, as a result of which there has been an interruption in the refrigeration that, if any of the foodstuffs affected is further processed or eaten, may cause health problems for a person. However, in the case of the products affected, there is, in conjunction with the reaching of the defrosting point, also a change of the medium 21 from the solid to the liquid state. Assisted by the initial pressure thereon, the medium 21, which is in the liquid state, emerges through the intended rupture point forming the activating means 22 and into the feed means 23 and is fed to the two conductor regions 18, 19 through the capillaries 24 in the feed means 23. The presence of the medium 21 in the region of the two conductor regions 18, 19 causes a change in the resistance between the first conductor region 18 and the second conductor region 19.

Once the foodstuffs affected have been unloaded and placed in store in the deep-freeze cabinets at the retailers, they are cooled down again to below the freezing point forming the threshold temperature value, which means that the medium 21 connected to the given foodstuff affected again changes from the liquid to the solid state, the medium 21 still being present in the region of the two conductor regions 18, 19, and possibly also inside the feed means 23 and the storage means 20.

When one of the foodstuffs affected is withdrawn through the withdrawal area of a deep-freeze cabinet, the electrical circuit 2 of the data carrier 1 is first supplied with the supply voltage V when the high-frequency carrier signal is received with the help of the communication means 5. The recognition means 25 then recognize the resistance value that represents the medium 21 being present between the two conductor regions 18, 19, whereupon the recognition means 25 generate the indication signal DS and transmit it to the signal processing means 4 to allow the communication signal CS to be generated and transmitted to the communication means 5. The communication means 5 then perform a load-modulation of the high-frequency carrier signal S in accordance with the communication signal CS, whereupon the refrigeration interruption alarm is triggered by the communication device. With the help of the data carrier 1, this gives the advantage that even if the most widely varying temperature cycles have been passed through, it is still possible to recognize a foodstuff for which a refrigeration interruption has occurred once in the past.

It may be mentioned that the trucks designed for deep-freezing may be arranged or equipped to communicate with the data carrier 1 so as to enable the refrigeration interruption alarm to be triggered as soon as the foodstuffs are taken from the truck. Similar precautions may also be taken at a foodstuff receiving facility on the retailers' premises. Deep-freezers in private use may also be fitted with arrangements of this kind.

In connection with the activating means 22, it may be mentioned that the data carrier 1 may also be fitted with a sharp point or blade, in which case the point or blade may damage the envelope of the storage means 20 when the data carrier 1 is applied to a product. Similarly, the feed means 23 may also be of a needle-like or lance-like shape. Both embodiments of the activating means 22 are of advantage if the data carrier 1 is used to determine the occurrence of a refrigeration interruption, if the medium 21 is already in its solid state at the time when the data carrier 1 is applied to a foodstuff or a product, and if a pressure that has to be applied to the data carrier is made use of at the time of application to damage the storage means with the help of the point or blade. It may also be mentioned in this connection that embodiments of this kind for the activation means may also be advantageous if the data carrier 1 is intended to determine the occurrence of a change in the ambient pressure on the data carrier 1, which forms the ambient parameter, in relation to a threshold pressure value.

It may further be mentioned that the feed means 23 and the storage means 20 may be arranged so as to be substantially in one piece, and that the feed means 23 may have a membrane as the intended rupture point forming the activating means 22, which membrane is destroyed when there is a change in the state of the medium 21 from the liquid to the solid state or when the change of pressure in relation to the threshold pressure value occurs for the first time.

It may also be mentioned that the two conductor areas 18, 19 may be provided with the help of a semiconductor material or of a combination of a metal with a semiconductor material.

It may be mentioned that the indication means 3 may alternatively be arranged to determine a change of the ambient temperature of the data carrier 1 in relation to more than one threshold temperature value. Where the indication means 3 are arranged to determine a change of the ambient temperature of the data carrier 1 in relation to, for example, two threshold temperature values, it has proved to be particularly advantageous if four conductor regions are provided and if two storage means are provided, each for a medium that can change its state as a function of the ambient temperature of the data carrier 1, with a first medium having a melting point different from that of the second medium, and if recognition means 25 are provided for recognizing a state of the impedance that exists between a given pair of conductor regions and that depends on the presence or absence of the given medium. Similar provisions may also be made in the case of a data carrier 1 that is arranged to determine the occurrence of the change in the ambient pressure on the data carrier 1, with the at least two storage means being arranged to store at least two media and to dispense their respective media as a function of the ambient pressure at different threshold pressure values.

In connection with the determination of a change of ambient temperature in relation to two threshold temperature values, it may further be mentioned that this may alternatively be carried out by means of the two conductor regions 18, 19. In this case there are, for example, two storage means provided for two media having different melting points. Also provided are feed means for feeding each of the two media, when in their liquid state, to the two conductor regions 18, 19. In addition, the recognitions means 25 are provided for recognizing three states of the impedance that exists between the two conductor regions and that depends on the presence or absence of the media, with a first state representing the absence of both media 21, a second state representing the presence of the medium 21 having the lower melting point, and a third state representing the presence of both media 21.

It may also be mentioned that two separate conductor regions may be provided for each of the media and that separate recognition means and separate feed means may similarly be provided.

It may further be mentioned that the activating means 22 may alternatively be implemented by means of a bimetallic bar that is fitted with a cutting or scoring device to cut into or score through the envelope of the storage means 20 at an activation temperature.

It may further be mentioned that the communication means 5 may be formed by means of capacitive coupling for communicating with a communication device.

It may further be mentioned that the data carrier may alternatively be arranged for communication by contact.

It may further be mentioned that the data carrier 1 may be fitted with a battery for supplying power to the circuit 2.

It may further be mentioned that the storage means 20 may alternatively be arranged to dispense the medium 21 if a threshold pressure value is exceeded.

It may further be mentioned that the data carrier 1 may also have data storage means that may be arranged to store indication data representing the determination of the occurrence of the change of the ambient parameter in relation to the threshold value of the ambient parameter. Also provided in the data storage means may be data for identifying the data carrier or for identifying a manufacturer or for identifying a production batch. Such data may, for example, be communicated to the data carrier 1 by the communication means 5 when the data carrier is initialized.

It may further be mentioned that the feed means 23, or wetting-promoting means forming parts of the feed means 23, may be provided in a region around or in direct contact with the at least one conductor region.

It may further be mentioned that the indication means 3 may have reference means by means of which it is possible to determine, in relation to a reference value, the first occurrence of the change of a parameter influencing the data carrier in relation to at least one threshold value for this parameter. This gives the advantage that the determination can be carried out not absolutely but relative to this reference value, which is an advantage if the value to be determined absolutely is relatively small or if the change of the parameter that is to be determined causes a relatively small change in an determinable value. In conjunction with the at least one conductor area 18, 19 and the data carrier having at least one storage means 20 and the recognition means 25, provision may be made, for example, for the reference means to have at least one reference conductor region and reference recognition means, while the medium 21 in the storage means 20 cannot be fed to the at least one reference conductor area. Hence the recognition means may be arranged in the present case to recognize a state of the impedance present in the at least one conductor region in relation to the state of the impedance present in the at least one reference region.

The indication means 3 may be arranged not only for electrical indication but also for optical or acoustic indication.

The indication means 3 may be arranged not only for indicating the change of an ambient parameter of a data carrier 1 but also for indicating the change of an internal parameter influencing a data carrier 1, in which case this internal parameter may be a temperature prevailing in the data carrier 1 or a pressure that occurs in the data carrier 1.

What is claimed is:

1. A data carrier (1) having an electrical circuit (2) by means of which are implemented indication means (3) that are arranged for indicating a change in a parameter influencing the data carrier (1) in relation to a threshold value of the parameter, which threshold value divides a first parameter range from a second parameter range, characterized in that;

the indication means (3) are arranged to give a permanent indication of the change in the parameter during the time following first the occurrence of the change;

at least one conductor region (18, 19) is provided to determine the occurrence of the change of the parameter;

at least one storage means (20) is provided that is arranged to store a medium (21) suitable for influencing an impedance, which medium (21) can be dispensed form the storage means towards the at least one conductor region (18, 19); and recognition means (25) are provided for recognizing a state of the impedance that exists in the at least one conductor region (18, 19) and that depends on the presence or absence of the medium (21).

2. A data carrier (1) as claimed in claim 1, comprising sensing means (7) to form the indication means (7), which sensing means (7) are arranged to sense ambient temperature and, when there is a change of the ambient temperature from a first ambient temperature range to a second ambient temperature range, to change from a first sensing state to a second sensing state, characterized in that the sensing means (7) are arranged to remain in the changed sensing state, irrespective of the ambient temperature, during the time following the first occurrence of said change.

3. A data carrier (1) as claimed in claim 1, characterized in that feed means (23) are provided for feeding the medium (21) to the at least one conductor region (18, 19).

4. A data carrier (1) as claimed in claim 1, characterized in that activation means (22) are provided that are arranged to activate the feed of the medium (21) to the at least one conductor region (18, 19).

5. A data carrier (1) as claimed in claim 1, characterized in that the at least one conductor region (18, 19) forms part of the electrical circuit (2)

6. A data carrier (1) as claimed in claim 1, characterized in that the storage means (20) are in the shape of a bladder.

7. A data carrier (1) as claimed in claim 1, characterized in that the feed means (23) are in capillary form.

8. A data carrier (1) as claimed in claim 1, characterized in that the recognition means (25) are implemented as a comparator stage.

9. A data carrier (1) as claimed in claim 1, characterized in that the medium (21) is in the form of an aqueous salt solution.

10. A circuit (2) for a data carrier (1), by means of which indication means (3) are implemented that are arranged to indicate a change in a parameter influencing the data carrier (1) in relation to a threshold value of the parameter, which threshold value divides a first parameter range from a second parameter range, characterized in that:

the indication means (3) are arranged to give a permanent indication of the change in the parameter during the time following the first occurrence of the change;

at least one conductor region (18, 19) is provided for ascertaining the change of the parameter; and recognition means (25) are provided for recognizing a state of the impedance that exists in the at least one conductor region (18, 19) and that is dependant on the presence or absence of a medium (21) suitable for influencing an impedance.

11. A circuit (2) as claimed in claim 10, characterized in that the circuit (2) is in the form of an integrated circuit.

12. A method of determination for determining the occurrence of a change in a parameter influencing a data carrier (1), wherein the occurrence of a change in a parameter in relation to a threshold value of the parameter is determined, which threshold value divides a first parameter range from second parameter range, characterized in that:

there is a permanent indication of the occurrence of the change of the parameter during the time following the first occurrence of said change;

at least one conductor region (18, 19) is provided for ascertaining the change of the parameter, and recognition means (25) are provided for recognizing a state of the impedance that exists in the at least one conductor region (18, 19) and that is dependant on the presence or absence of a medium (21) suitable for influencing an impedance.

* * * * *